United States Patent [19]

Wusirika

[11] Patent Number: 4,546,089
[45] Date of Patent: Oct. 8, 1985

[54] GROUP 4B BORIDE AND $VB_2/YB_2$

[75] Inventor: Raja R. Wusirika, Painted Post, N.Y.

[73] Assignee: Corning Glass Works, Corning, N.Y.

[21] Appl. No.: 454,720

[22] Filed: Dec. 30, 1982

[51] Int. Cl.$^4$ .............................................. C04C 35/58
[52] U.S. Cl. ...................................................... 501/96
[58] Field of Search ......................................... 501/96

[56] References Cited

U.S. PATENT DOCUMENTS

| | | | |
|---|---|---|---|
| 2,984,807 | 5/1961 | Blum | 501/98 |
| 3,433,471 | 3/1969 | Alper | 501/96 |
| 3,437,606 | 4/1969 | Mercuri | 501/96 |
| 4,259,119 | 3/1981 | Watanabe et al. | 501/96 |

FOREIGN PATENT DOCUMENTS 56-78480  6/1981  Japan ..................................... 501/96

Primary Examiner—Mark L. Bell
Attorney, Agent, or Firm—R. N. Wardell

[57] ABSTRACT

A powder sinterable (without necessarily hot pressing) to a density approaching theoretical density of its composition and to 0–5 volume % open porosity, which powder has a particle size substantially less than 5 μm and consisting of about 2 to 10 mole % of diboride of vanadium or yttrium, optionally very small amounts of oxygen and carbon, and the balance essentially diboride of Group 4b metal. The diborides can be in solid solution in the powder. The minor diborides are sintering aids.

11 Claims, No Drawings

GROUP 4B BORIDE AND VB$_2$/YB$_2$

BACKGROUND OF THE INVENTION

The invention relates to powders of substantially diboride of Group 4b metal which are sinterable (without hot pressing being required, although permissible) to densities approaching theoretical densities of their compositions.

It is known that Group 4b metal diboride powders do not sinter into strongly coherent dense bodies. This problem with respect to titanium diboride was overcome by the addition of 3–7 wt.% chromium diboride according to U.S. Pat. No. 2,984,807.

In the case of hot pressed Group 4b metal diborides, densification was attained by adding rare earth and alkaline earth hexaborides according to U.S. Pat. No. 3,437,606.

SUMMARY OF THE INVENTION

This invention is based on the discovery that diborides of vanadium and yttrium, when incorporated in minor amounts in Group 4b metal diboride powders, act as sintering aids that render the powders sinterable to densities approaching theoretical densities of their compositions.

The invention is a sinterable powder and a body of sintered powder. The powder has a particle size substantially less than 5 μm and consists of about 2 to 10 mole percent of diboride of vandium or yttrium, optionally very small amounts of oxygen and carbon, and the balance diboride of Group 4b metal (i.e. titanium, zirconium and/or hafnium). Advantageously, the diborides can be in solid solution with each other in the powder, although admixture of the separate diboride powders is within the scope of the invention.

DETAILED DESCRIPTION

The invention will be illustrated by means of examples of the preferred solid solution powders contrasted with similarly prepared powders without sintering aids according to the invention.

Three powders were made from aqueous solutions of batch materials as indicated in Table 1. The solution for each powder was heated at 100 C. in an oven until a dried and decomposed or charred residue was formed, which was a very fine and intimate mixture of the corresponding oxide(s) of the decomposed metal salt(s), B$_2$O$_3$ and carbon. Some combustion loss of carbon appears to occurred during heating at 100° C. Each residue was then fired at 1400° C. for 2 hours in argon to effect carbothermic reduction of the oxides with the carbon in such residue, thereby yielding corresponding diboride agglomerates which were very friable and with the evolution of carbon monoxide from the reduction reaction. Each of the agglomerates was separately milled in a planetary mill for about 10–15 minutes to yield substantially less than 5 μm powder.

TABLE 1

| Batch Material | Composition of Powder | | |
|---|---|---|---|
| | A | B | C |
| TiCl$_4$ solution in cc (10 cc = 4.5 gm. TiO$_2$) | 56.1 | 56.1 | 56.1 |
| Boric Acid in gm | 41.2 | 41.7 | 41.7 |
| Sucrose in gm. | 71.3 | 71.3 | 71.3 |
| Yttrium acetate in gm Y(C$_2$H$_3$O$_2$)$_2$·H$_2$O | — | 5.7 | — |
| V$_2$O$_5$ (dissolved in HCl) gm | — | — | 1.54 |

The intended compositions of the three powders are set forth in Table 2. Powder A is not of the invention, but is for the purpose of illustrating the prior art problem. Powders B and C are of the invention. In each of these actual fired powders there probably was very small amounts of oxygen and carbon (each less than 1 wt.%) in the diboride.

TABLE 2

| Powder | Intended Composition (molar) |
|---|---|
| A | TiB$_2$ & excess carbon |
| B | 0.95 TiB$_2$ + 0.05 YB$_2$ solid solution |
| C | 0.95 TiB$_2$ + 0.05 VB$_2$ solid solution |

To compare the sintering ability of these three powders, they were pressed into bars and fired at 2000° C. in argon for 0.5 hours. The properties of the fired bars and the particle sizes of the diboride powders of which they were formed are shown in Table 3. Powders B and C of the invention sintered close to theoretical density of their compositions due to the presence of the diboride sintering aids. Powder A exhibited a lack of significant sintering ability. These differences are especially highlighted by the variations in density and open porosity.

TABLE 3

| Powder | Particle Size μm | % Linear Shrinkage | Density gm/cc | Volume % Open Porosity | Electrical Resistivity ohm-cm |
|---|---|---|---|---|---|
| A | 2.0 | 13 | 2.0 | 40–50 | 0.14 |
| B | 1.5 | 25 | 3.8 | 5 | 0.15 |
| C | 1.1 | 20 | 4.4 | 0 | 0.16 |

Similar results can be attained by substituting, in whole or in part, zirconium diboride and/or hafnium diboride for titanium diboride. Likewise, the sintering aid effect can be obtained by merely admixing a separate vanadium diboride powder or yttrium diboride powder in the same molar amount with a separate Group 4b metal diboride powder to form the powder of the invention.

Although the invention provides substantial densification without hot pressing, nevertheless the invention extends to and includes hot pressed solid bodies of powder according to this invention since hot pressing necessarily includes sintering of the powder as part of the hot pressing function.

I claim:

1. A sinterable powder having a particle size substantially less than 5 μm, consisting of about 2 to 10 mole % of diboride of vanadium or yttrium, optionally very small amounts of oxygen and carbon, and the balance diboride of Group 4b metal, and being sinterable into a body having density approaching theoretical density of the composition and 0–5 volume % open porosity.

2. The powder of claim 1 wherein diboride of vanadium is in solid solution with the Group 4b metal diboride.

3. The powder of claim 2 wherein the Group 4b metal is titanium.

4. The powder of claim 1 wherein diboride of yttrium is in solid solution with the Group 4b metal diboride.

5. The powder of claim 4 wherein the Group 4b metal is titanium.

6. A solid body of sintered powder of claim 1 and having been sintered to a density approaching theoretical density of the composition and 0-5 volume % open porosity.

7. The powder of claim 1 wherein each of oxygen and carbon is less than 1 wt. %.

8. A solid body of sintered powder of claim 2 and having been sintered to a density approaching theoretical density of the composition and 0-5 volume % open porosity.

9. A solid body of sintered powder of claim 3 and having been sintered to a density approaching theoretical density of the composition and 0-5 volume % open porosity.

10. A solid body of sintered powder of claim 4 and having been sintered to a density approaching theoretical density of the composition and 0-5 volume % open porosity.

11. A solid body of sintered powder of claim 5 and having been sintered to a density approaching theoretical density of the composition and 0-5 volume % open porosity.

* * * * *